(12) United States Patent
Browne et al.

(10) Patent No.: US 9,316,212 B2
(45) Date of Patent: Apr. 19, 2016

(54) SUPERELASTIC SHAPE MEMORY ALLOY OVERLOADING AND OVERHEATING PROTECTION MECHANISM

(71) Applicant: GM GLOBAL TECHNOLOGY OPERATIONS LLC, Detroit, MI (US)

(72) Inventors: Alan L. Browne, Grosse Point, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 155 days.

(21) Appl. No.: 13/661,063

(22) Filed: Oct. 26, 2012

(65) Prior Publication Data
US 2014/0026554 A1    Jan. 30, 2014

Related U.S. Application Data

(63) Continuation-in-part of application No. 13/560,878, filed on Jul. 27, 2012, now Pat. No. 8,857,273.

(51) Int. Cl.
*F01B 29/00* (2006.01)
*F03G 7/06* (2006.01)

(52) U.S. Cl.
CPC .................... *F03G 7/065* (2013.01)

(58) Field of Classification Search
CPC .......... F03G 7/065; F03G 7/06; F01B 29/00; F01B 29/10; F02G 1/04
USPC ................................... 60/527–529
See application file for complete search history.

(56) References Cited

U.S. PATENT DOCUMENTS

| | | | | |
|---|---|---|---|---|
| 5,079,920 | A * | 1/1992 | Whitehead | F03G 7/065 60/527 |
| 7,498,926 | B2 * | 3/2009 | Browne | B60K 11/085 123/41.06 |
| 8,109,087 | B2 * | 2/2012 | Usoro | F03G 7/065 60/527 |
| 8,127,543 | B2 * | 3/2012 | Von Behrens et al. | 60/527 |
| 8,179,018 | B2 * | 5/2012 | Gao | H01L 41/125 310/307 |
| 8,505,987 | B2 * | 8/2013 | Browne | E05B 47/0009 292/201 |
| 8,661,810 | B2 * | 3/2014 | Browne | F03G 7/065 60/528 |
| 8,741,076 | B2 * | 6/2014 | Gao | F03G 7/065 148/402 |
| 2004/0068985 | A1 * | 4/2004 | Mernoe | 60/527 |
| 2004/0104580 | A1 * | 6/2004 | Spiessl | D06F 37/42 292/84 |
| 2004/0256920 | A1 * | 12/2004 | Gummin | F03G 7/065 310/15 |
| 2007/0193267 | A1 * | 8/2007 | He | E05B 47/0009 60/527 |
| 2007/0277877 | A1 * | 12/2007 | Ghorbal | F16K 31/002 137/67 |
| 2010/0332151 | A1 * | 12/2010 | Hao et al. | 702/41 |
| 2011/0088387 | A1 * | 4/2011 | Von Behrens et al. | 60/527 |
| 2012/0001461 | A1 * | 1/2012 | Alexander | B60N 2/4873 297/216.12 |
| 2012/0223727 | A1 * | 9/2012 | Gao | F03G 7/065 324/691 |

* cited by examiner

*Primary Examiner* — Thomas Denion
*Assistant Examiner* — Shafiq Mian

(57) ABSTRACT

An actuation assembly adapted for driving a load and protecting against overloading and overheating conditions, includes an actuator defining a stroke when exposed to an activation signal, and further includes a protection device comprising a superelastic shape memory alloy element connected in series to and cooperatively configured with the actuator, and operable to both produce a secondary work output path for the actuator and discontinue the signal.

16 Claims, 1 Drawing Sheet

SUPERELASTIC SHAPE MEMORY ALLOY OVERLOADING AND OVERHEATING PROTECTION MECHANISM

RELATED APPLICATIONS

This patent application claims priority to, and benefit from U.S. Non-Provisional patent application Ser. No. 13/560,878, entitled "MECHANICAL OVERLOAD PROTECTION UTILIZING SUPERELASTIC SHAPE MEMORY ALLOY ACTUATION" and filed on Jul. 27, 2012, the disclosure of which is incorporated by reference herein.

BACKGROUND OF THE INVENTION

1. Field of the Invention

The present disclosure generally relates to devices for and methods of protecting an actuator against overload conditions; and more particularly, to a device for and method of protecting an actuator against both overloading and overheating that utilize superelastic (also known as "pseudoelastic") shape memory alloy actuation.

2. Discussion of Prior Art

Active material actuators, such as shape memory alloy wires, are generally protected from mechanical overload by the use of mechanical springs or electrical control schemes to avoid damage to the actuators when the output load exceeds a recommended limit. Both of these measures, however, present various concerns in the art. For example, mechanical springs needed for overload protection tend to be bulky because of the conflicting requirements of high force threshold for the overload function necessary to enable normal operation, and low stiffness to restrict the maximum stress experienced by the actuator when the overload protection system is activated. The electrical/control schemes are more versatile, but they increase system cost.

More particularly, conventional solutions typically employ pre-loaded linear springs. In these systems, the pre-loads in the springs are typically set when the springs are manufactured or individually imposed through mechanical constraints, such as pre-load screws. The resulting protection effects high stiffness until the force in the actuator exceeds the pre-load force level; beyond this point, the overload protection system exhibits a stiffness corresponding to the native stiffness of the linear spring. This leads naturally to conflicting requirements on the design of the overload protection system. A high pre-load force requires either an overload spring with a high native stiffness or an overload stiffness spring with low native stiffness that is pre-loaded through a significant part of its useful deflection range to achieve the high preload force. The former approach leads to a compact design for the overload protection system but results in high maximum force levels in the actuator during a mechanical overload event; while the latter approach results in a much lower maximum force level in the actuator during a mechanical overload event, and leads to an unwieldy overload protection system due to the large undeflected size of the overload protection spring.

BRIEF SUMMARY OF THE INVENTION

Responsive to these and other concerns, the present invention recites a scale independent device for and method of overload and overheating protection that utilizes a superelastic shape memory alloy protection element to accomplish the same. As an overload protection device, the invention offers a secondary work output path, when the system experiences a mechanical overload event. By employing a superelastic or normally Austenitic shape memory alloy element based mechanical overload protection system, the invention is useful for offering a non-linear overload protection system. By discontinuing the activation signal, produced, for example, by electric current flow across an SMA actuator during Joule heating, the invention is further useful for protecting against overheating due to prolonged exposure to the signal.

In general, an actuation assembly adapted for driving a load, and mitigating/preventing overloading and overheating conditions is recited. The assembly includes an actuator producing an actuating force and stroke when activated, and composing a circuit, wherein the circuit, when closed, activates the actuator, and an overload and overheating protection device. The inventive device includes a protective austenitic shape memory alloy element, e.g., a wire connected in series to the actuator. The protective element is configured such that the stress activation signal is caused by the overload condition, and is communicatively coupled to the circuit. The change enables the actuating force to strain the wire, so as to produce a secondary work output path for the actuator, and is operable to open or close the circuit, so as to deactivate the actuator.

The disclosure, including use of a lever transmission, and multiple protective wires, may be understood more readily by reference to the following detailed description of the various features of the disclosure and the examples included herein.

BRIEF DESCRIPTION OF THE SEVERAL VIEWS OF THE DRAWING

A preferred embodiment(s) of the invention is described in detail below with reference to the attached drawing figures of exemplary scale, wherein.

DETAILED DESCRIPTION OF THE INVENTION

Figure 1:
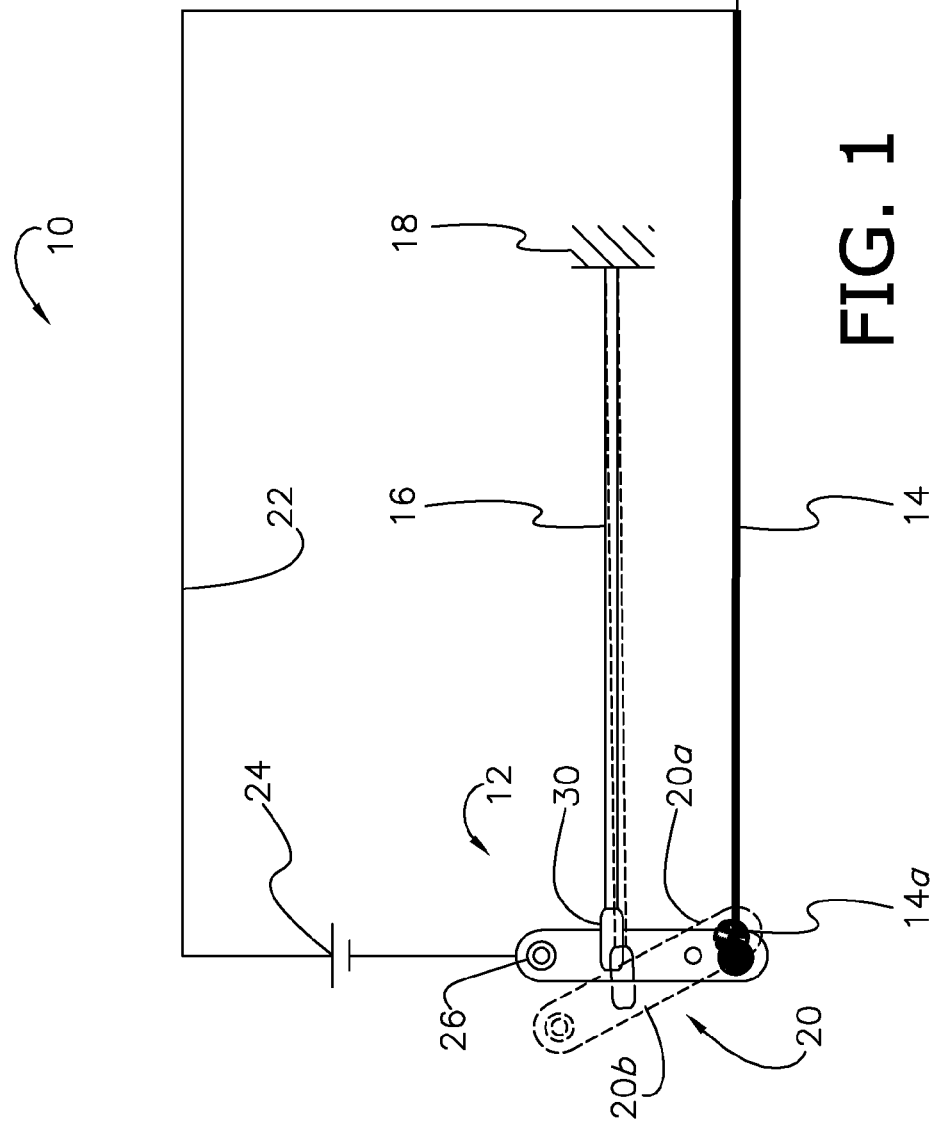
FIG. 1 is an elevation of an actuation assembly composing a circuit, and comprising an active material actuator having drivenly attached thereto an overload protection device further comprising a superelastic shape memory alloy wire and lever operable to open and close the circuit, in accordance with a preferred embodiment of the invention.

The following description of the preferred embodiments is merely exemplary in nature and is in no way intended to limit the invention, its application, or uses. The present invention concerns a novel actuation assembly 10 comprising an overload protection device 12 and actuator 14. The assembly 10 is configured to drive a load 100 and provide mechanical overload and overheating protection when the load 100 is greater than a predetermined design threshold, based on the actuator 14 and/or the mechanisms driven thereby. More particularly, the inventive system 10 employs a protective superelastic element (e.g., wire) 16 that is configured to offer both overload protection by creating a secondary work output path, and overheating protection by discontinuing the activation signal in response to the overload condition.

Many active materials based actuators (e.g. SME-SMA wires) possess a small useful stroke. Therefore, in mechanical overload protection systems for such actuators, the overload protection system must not detract from the stroke under normal operating conditions. At the same time, the system 10 must be capable of allowing the actuator 14 to complete its entire stroke while limiting the maximum force experienced by the actuator 14 to a safe value when a mechanical overload event occurs. The invention uses the sharp reduction in modulus due to the onset of stress-induced Austenite to Martensite transformation in the superelastic SMA regime to provide a high overload force threshold and a low post-overload stiffness without significantly increasing the bulk/size of the actuator 14. Although an active material actuator, such as a thermally activated shape memory SMA (i.e., "SME-SMA") actuator provides a natural context for describing the use of the instant superelastic SMA ("SE-SMA")-based overload protection system 10, it should be noted that the proposed system 10 may be used with any primary actuator that shares the high overload force threshold and desirable low post-overload stiffness characteristics of SMA wire. More particularly, the invention is suitable for use by any actuator 14 that defines a stroke, presents a maximum actuation force, and is susceptible to overloading. In an automotive or commercial setting, for example, the actuation assembly 10 may be used to drive at least one exterior vent cover (not shown) susceptible to obstruction by snow, ice, mud, or the like.

As used herein the term "active material" is defined as any of those materials or composites that exhibit a reversible change in fundamental (i.e., chemical or intrinsic physical) property when subjected to an activation signal. Suitable active materials for use as an actuator include but are not limited to shape memory materials that have the ability to remember their original at least one attribute such as shape, which can subsequently be recalled by applying an external stimulus. Exemplary shape memory materials for use as actuators include shape memory alloys (SMA), shape memory polymer (SMP), shape memory ceramics, electroactive polymers (EAP), ferromagnetic SMA's, electrorheological (ER) compositions, magnetorheological (MR) compositions, dielectric elastomers, ionic polymer metal composites (IPMC), piezoelectric polymers, piezoelectric ceramics, various combinations of the foregoing materials, and the like. Again, however, with respect to the overload protection device 12, a suitable active material presenting a stress-induced high to low modulus/viscosity/plasticity transformation, such as a superelastic SMA, or active shearing fluid, is applied in the present invention.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. Generally, in the low temperature, or Martensite phase, shape memory alloys can be plastically deformed and upon exposure to some higher temperature will transform to an Austenite phase, or parent phase, returning to their shape prior to the deformation.

Shape memory alloys exist in several different temperature-dependent phases. The most commonly utilized of these phases are the so-called Martensite and Austenite phases. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Generally, the shape memory alloys are softer and more easily deformable in their Martensitic phase and are harder, stiffer, and/or more rigid in the Austenitic phase. In view of the foregoing, a suitable activation signal for use with shape memory alloys is a thermal activation signal having a magnitude to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite type transition, and the material will recover the original, annealed shape. Hence, one-way shape memory effects are only observed upon heating. Active materials comprising shape memory alloy compositions that exhibit one-way memory effects do not automatically reform, and require an external mechanical force to return the shape to its previous configuration.

Intrinsic and extrinsic two-way shape memory materials are characterized by a shape transition both upon heating from the Martensite phase to the Austenite phase, as well as an additional shape transition upon cooling from the Austenite phase back to the Martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the Martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Shape memory alloy exhibits a modulus increase of 2.5 times and a dimensional change of up to 8% (depending on the amount of pre-strain) when heated above their Martensite to Austenite phase transition temperature. Stress induced phase changes in SMA known as superelasticity (or pseudoelasticity) refer to the ability of SMA to return to its original shape upon unloading after a substantial deformation in a two-way manner. Application of sufficient stress when an SMA is in its Austenitic phase will cause it to change to its lower modulus Martensitic phase in which it can exhibit up to 8% of superelastic deformation. Removal of the applied stress will cause the SMA to switch back to its Austenitic phase in so doing recovering its starting shape and higher modulus, and dissipating energy. More particularly, the application of an externally applied stress causes martensite to form at temperatures higher than $M_s$. The macroscopic deformation is accommodated by the formation of martensite. When the stress is released, the Martensite phase transforms back into the Austenite phase and the SMA returns back to its original shape. Superelastic SMA can be strained several times more than ordinary metal alloys without being permanently plastically deformed, however, this is only observed over a specific temperature range, with the largest ability to recover occurring close to $A_f$.

Thus, for the purposes of this invention, it is appreciated that the modulus of superelastic SMA material reduces significantly (e.g. by a factor of 2.5 to 3) when it undergoes a stress-driven, solid state transformation from an Austenitic to a de-twinned Martensitic phase. The proposed system 10 reduces the stress within the actuator 14 during a mechanical overload event, and offers minimal reduction in useful stroke during normal actuation. The low modulus of the SME-SMA material is limited to the phase transformation event which may correspond to about 4-8% strain; beyond this the modulus reverts back to a high value. Accordingly, the low stiffness offered by the overload protection system 10 persists only over an actuator stroke that corresponds to the 4-8% material strain. This is sufficient for most active material based actuators (e.g. SME-SMA wires, piezo actuators, etc). A transmission 20, however, is preferably provided intermediate the device 12 and actuator 14, for actuators 14 that have a larger stroke.

Returning to the configuration of the present invention, the overload protection device 12 is configured to provide a secondary work output path (shown in hidden-line type in FIG. 1) for the actuator 14, so as to prevent or mitigate a mechanical overload condition (e.g., wherein tensile stress within a wire actuator exceeds its tensile strength). The inventive device 12 includes the protective superelastic element 16, which presents an initial deformation (e.g., straining) required force not greater than the maximum actuation force, and offers a non-linear relationship between force and displacement (or deformation). That is to say, the amount of force that is required to displace the element 16 is not proportional to the displacement over the stroke, as is the case with conventional springs, whose k-values are presented by the slope of their linear relationship. More preferably, the resistive element 16 offers a drop in force during the stroke; and most preferably, the element 16 offers a decreasing force versus displacement profile over the entire stroke. Finally, once the stroke is complete and the actuator 14 is de-actuated, the preferred element 16 is configured to autonomously return to its original condition, so as to reset the overload protection device 12.

In the preferred embodiment, the element 16 presents a wire formed at least in part by, and more preferably entirely of normally superelastic shape memory alloy (FIG. 1). That is to say, the shape memory alloy presents an Austenitic finish temperature less than the lowest anticipated operating temperature of the actuator 14 (e.g., less than −40° C. for automotive settings). Based on the manner of actuation (linear, angular, etc.), the application and/or device geometry and functionality, the element 16 may present any configuration, including bent and sinuous configurations. In FIG. 1, both the element 16 and actuator 14 present a shape memory wire, wherein the term "wire" shall be construed to include other tensile structures such as cables, braids, chains, etc., that perform equivalently.

The protective wire 16 is connected in series with the actuator wire 14 at a first end, and with fixed structure 18 at the opposite end, so as to be drivenly coupled thereto (FIG. 1). The Austenitic wire 16 is cooperatively configured with the actuator 14, such that the modulus corresponds to the load level where it is appreciated that the actuator 14 would begin to experience excessive stress if blocked. As a result, activation of the actuator 14 will first apply a force trying to manipulate the load 100, but if the force level exceeds the modulus (e.g., the cover is blocked, etc.), the element 16 will instead start to stretch, thereby preserving the integrity of the actuator 14 (FIG. 1).

More preferably, the actuator wire 14 and protective wire 16 are cooperatively configured such that the maximum actuation force offered by the wire 14 is operable to first transform the SMA of the protective wire 16 and then stretch the low modulus material. That is to say, the assembly 10 may be configured such that transformation occurs at the inception of overload protection. Alternatively, the actuator wire 14 and protective wire 16 are cooperatively configured such that the maximum actuation force offered by the wire 14 is operable to stretch the Austenitic spring$_{[ALB1]}$ a predetermined length, transform the SMA to its lower modulus state at the predetermined length, and then continue stretching the lower modulus wire 16. In other words, where the SE-SMA element 16 presents an Austenitic to Martensitic phase transformation stress threshold, the threshold may be overcome by a transforming force not greater than the maximum actuation force, or not greater than the initial deformation required force. An exemplary predetermined length may equal a tenth, quarter, or half of the overall stroke.

As previously presented, the protection device 12 includes means for discontinuing the activation signal, contemporaneous with the creation of the secondary work output path. In the illustrated embodiment, the system 10 presents a circuit 22 for Joule heating an SME-SMA actuator. The system 10 and circuit 22 further include a conductive lever transmission 20 intermediate the actuator 14 and element 16 (FIG. 1). The lever 20 defines first and second arms 20a,b and a pivot axis. The actuator 14 is attached to one of the arms 20a so as to be spaced from the axis a first distance. The protective wire 16 is attached to the other arm 20b and spaced from the axis a second distance, preferably in such a manner as to present mechanical advantage. That is to say, the second distance may be greater than the first, so as to increase the overload force required to stretch the wire 16, and thereby enable a smaller cross-sectional area; or, the second distance may be less than the first, so as to reduce displacement and thereby enable a shorter wire 16 to be used.

In the normal operating position (shown in continuous-line type in FIG. 1), the lever 20 closes the circuit 22 enabling current to flow from the power source (e.g., vehicle charging system, battery, etc.) 24 to the actuator 14. When the actuator 14 is activated, it will first attempt to displace the load 100. If the load 100 is too great, thereby presenting an overload condition, the actuation force generated by the actuator 14 will increase until overcoming the resistance offered by the device 12. In the illustrated embodiment, this includes the force necessary to pivot the lever 20 and strain the protective wire 16 or transform and then strain the wire 16. It is appreciated that a detent, magnet, or other holding mechanism 26 between the lever 20 and circuit 22 may be added to further increase the resistance (and may aid in return). By manipulating the lever work is performed at the stationary end 14a of the actuator 14, and the circuit 22 is opened, such that the activation signal (i.e., current) is discontinued. Once the overload condition ceases, it is appreciated that the protective SME-SMA wire 16 will revert back to the Austenitic phase and attempt to achieve its original length and configuration. When the actuator 14 cools to below its transformation temperature range and achieves its more malleable Martensitic state, the protective wire 16 is able to stretch the actuator 14 back to its original length (FIG. 1).

Figure 2:
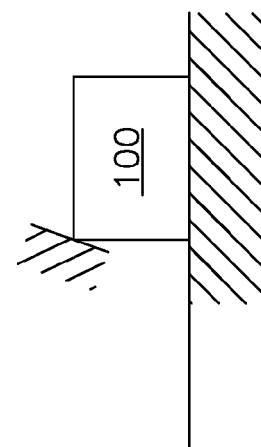
FIG. 2 is a partial elevation of an overload protection device comprising a plurality of superelastic shape memory alloy wires and a lever defining a greater plurality of connecting holes for receiving the wires, in accordance with a preferred embodiment of the invention.

Alternatively, an adjustable overload protection device 12 may include multiple wires 16 connected in parallel and individually connectable to the actuator 14, so as to modify the overload protection threshold. In FIG. 2, for example, individual protective wires 16a-c are connected to one of a plurality of receiving holes 28 defined by the lever 20, wherein each hole effects a different lever arm. That is to say, the holes 28 are spaced differing distances from the pivot axis, and configured to removably receive the wire 16, and more preferably, a reinforcing connector/electrically insulating barrier 30 attached at the end of the wire 16. It is appreciated that increasing proximity of the hole to the pivot axis reduces the influence upon the actuator 14.

This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. All ranges directed to the same quantity of a given component or measurement are inclusive of the endpoints and independently combinable.

What is claimed is:

1. An overload and overheating protection device, comprising:
an austenitic shape memory alloy protection element operable to undergo a solid state transformation from an austenitic phase having a first modulus to a de-twinned martensitic phase having a second modulus smaller than the first modulus when a transforming force is applied to the austenitic shape memory alloy protection element;

wherein:
the austenitic shape memory alloy protection element:
is adapted for use with a shape memory alloy actuator and for protecting the shape memory alloy actuator from an overload condition of the shape memory alloy actuator;
has an austenitic finish temperature less than a lowest operating temperature of the shape memory alloy actuator; and
is communicatively coupled to an electrical circuit;
the shape memory alloy actuator:
is distinct from the austenitic shape memory alloy protection element;
is drivenly coupled to a load;
defines a stroke;
produces an actuating force when activated;
is an element of the electrical circuit; and
is activated by closing the electrical circuit;
the transforming force is caused by the overload condition of the shape memory alloy actuator;
the solid state transformation enables the actuating force to cause tensile strain in the austenitic shape memory alloy protection element, so as to produce a secondary work output path for the shape memory alloy actuator; and
the solid state transformation further enables the shape memory alloy actuator to open the circuit, so as to deactivate the shape memory alloy actuator.

2. The overload and overheating protection device as defined in claim 1, wherein the austenitic shape memory alloy protection element is connected in series to the shape memory alloy actuator.

3. The overload and overheating protection device as defined in claim 1, wherein the austenitic shape memory alloy protection element presents at least one wire.

4. The overload and overheating protection device as defined in claim 1, further comprising:
a lever defining a pivot axis and first and second arms, wherein the shape memory alloy actuator is drivenly connected to the first arm;
the austenitic shape memory alloy protection element is a wire;
the wire is drivenly connected in tension to the second arm antagonistic to the shape memory alloy actuator; and
said lever being operable to open the circuit when the first arm is driven by the shape memory alloy actuator.

5. The overload and overheating protection device as defined in claim 1, wherein the austenitic shape memory alloy protection element is a wire, and an electrically insulating barrier mechanically connects the wire to the circuit and electrically insulates the wire from the circuit.

6. The overload and overheating protection device as defined in claim 1, further comprising a holding mechanism to urge the shape memory alloy actuator to close the circuit to activate the shape memory alloy actuator.

7. The overload and overheating protection device as defined in claim 4, wherein the first arm is longer than the second arm, so as to provide mechanical advantage.

8. The overload and overheating protection device as defined in claim 4, wherein the second arm is longer than the first, so as to provide mechanical advantage.

9. The overload and overheating protection device as defined in claim 6, wherein the holding mechanism includes a detent.

10. An actuation assembly adapted for driving a load and for protecting against an overload condition, said assembly comprising:

a shape memory alloy actuator to produce an actuating force and stroke when activated, and the shape memory alloy actuator composing a circuit, wherein the circuit, when closed, is to activate the shape memory alloy actuator; and an overload and overheating protection device including an austenitic shape memory alloy wire:
- having an austenitic finish temperature less than a lowest operating temperature of the shape memory alloy actuator;
- distinct from the shape memory alloy actuator;
- operable to undergo a solid state transformation from an austenitic phase having a first modulus to a de-twinned martensitic phase having a second modulus smaller than the first modulus when a transforming force is applied to the austenitic shape memory alloy wire;
- connected in series to the shape memory alloy actuator, configured such that the transforming force is caused by the overload condition; and
- communicatively coupled to the circuit;

said solid state transformation enabling the actuating force to cause tensile strain in the austenitic shape memory alloy wire, so as to produce a secondary work output path for the shape memory alloy actuator; and said tensile strain being further operable to open the circuit, so as to deactivate the shape memory alloy actuator.

11. The actuation assembly as defined in claim 10, wherein the shape memory alloy actuator includes a Martensitic shape memory alloy wire.

12. The actuation assembly as defined in claim 10, wherein the overload and overheating protection device is adjustable so as to modify an overload protection threshold for enabling the actuating force to cause the solid state transformation and tensile strain in the austenitic shape memory alloy wire.

13. The actuation assembly as defined in claim 10, wherein a holding mechanism is to urge the overload and overheating protection device to close the circuit to activate the shape memory alloy actuator.

14. The actuation assembly as defined in claim 12, wherein the overload and overheating protection device further includes a lever defining a pivot axis and a plurality of holes spaced differing distances from the pivot axis, and each hole is configured to removably receive the austenitic shape memory alloy wire.

15. An actuation assembly adapted for driving a load and for protecting against an overload condition, said assembly comprising:

an actuator producing an actuating force and stroke when activated, and composing a circuit, wherein the circuit, when closed, activates the actuator;

an overload and overheating protection device including an austenitic shape memory alloy wire operable to undergo a change in fundamental property when exposed to or occluded from a stress activation signal, connected in series to the actuator, configured such that the stress activation signal is caused by the overload condition, and communicatively coupled to the circuit;

said change enabling the actuating force to strain the austenitic shape memory alloy wire, so as to produce a secondary work output path for the actuator; and said change being further operable to open or close the circuit, so as to deactivate the actuator;

wherein the overload and overheating protection device is adjustable so as to modify the stress activation signal; and wherein the overload and overheating protection device further includes a lever defining a pivot axis and a plurality of holes spaced differing distances from the pivot axis, and each hole is configured to removably receive the austenitic shape memory alloy wire.

16. An actuation assembly adapted for driving a load and for protecting against an overload condition, said assembly comprising:

an actuator producing an actuating force and stroke when activated, and composing a circuit, wherein the circuit, when closed, activates the actuator; and an overload and overheating protection device including an austenitic shape memory alloy wire operable to undergo a change in fundamental property when exposed to or occluded from a stress activation signal, connected in series to the actuator, configured such that the stress activation signal is caused by the overload condition, and communicatively coupled to the circuit;

said change enabling the actuating force to cause tensile strain in the austenitic shape memory alloy wire, so as to produce a secondary work output path for the actuator;

said change being further operable to open the circuit, so as to deactivate the actuator;

wherein the overload and overheating protection device is adjustable so as to modify an overload protection threshold for enabling the actuating force to strain the austenitic shape memory alloy wire;

and wherein the overload and overheating protection device further includes a lever defining a pivot axis and a plurality of holes spaced differing distances from the pivot axis, and each hole is configured to removably receive the austenitic shape memory alloy wire.

* * * * *